United States Patent [19]

Marchou

[11] Patent Number: 5,131,687
[45] Date of Patent: Jul. 21, 1992

[54] DEVICE FOR MAKING A SEALED CONNECTION BETWEEN A TUBE AND A FLEXIBLE HOSE

[75] Inventor: Jacques Marchou, Foix, France

[73] Assignee: Autobrevets, France

[21] Appl. No.: 526,834

[22] Filed: May 22, 1990

[30] Foreign Application Priority Data

May 29, 1989 [FR] France .................... 89 07021

[51] Int. Cl.[5] ........................... F16L 55/00
[52] U.S. Cl. ......................... 285/23; 285/242; 285/259; 285/314; 285/319; 285/906; 285/915
[58] Field of Search ............ 285/242, 258, 23, 259, 285/314, 319, 906, 915

[56] References Cited

U.S. PATENT DOCUMENTS 1,903,445  4/1933  Ernst ...................... 285/242 X
3,262,721  7/1966  Knight ..................... 285/242 X
4,775,173  10/1988  Sauer ...................... 285/242

FOREIGN PATENT DOCUMENTS 530957   8/1931  Fed. Rep. of Germany ...... 285/242
909769   5/1946  France .
1249979  11/1960  France .
1034622  6/1966  United Kingdom .

Primary Examiner—Dave W. Arola
Attorney, Agent, or Firm—Brumbaugh, Graves, Donohue & Raymond

[57] ABSTRACT

A disconnectable device for making a sealed connection quickly between a smooth and rigid tube and a flexible hose which is engaged over the rigid tube, the diameter of the tube being greater than the inside diameter of the hose. A rigid ring preferably made of metal or of a semi-rigid plastic, is disposed coaxially around the hose, the ring having an inside shoulder constituting an axial abutment for the outside surface of the hose, the abutment sufficing on its own, by virtue of the wall of the hose being pinched thereagainst, to urge together the sole pair of complementary sealing surfaces of the device, one on the tube and the other on the inside surface of the hose. Complementary axial fastening means are connected respectively to the ring and to the tube.

13 Claims, 1 Drawing Sheet

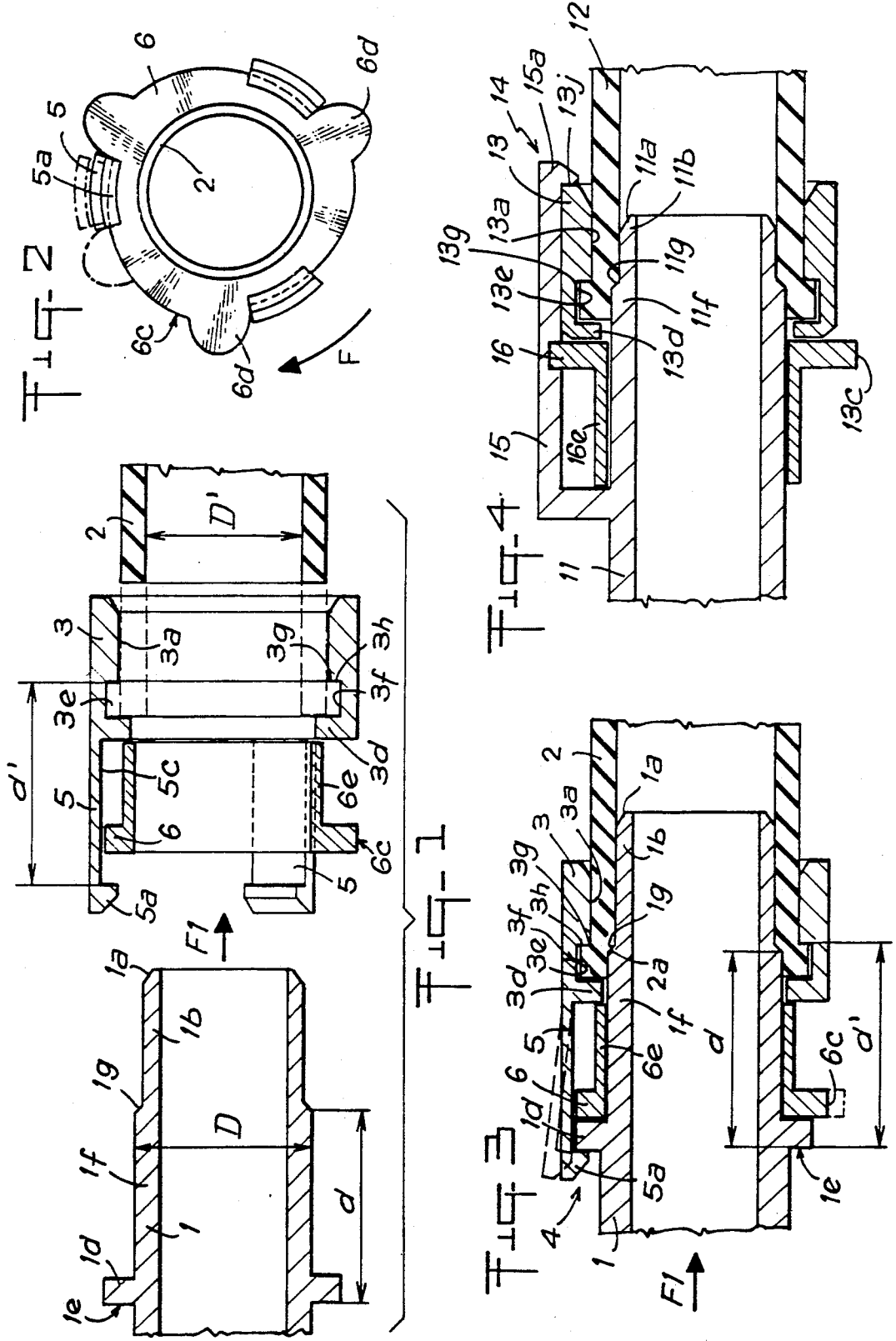

DEVICE FOR MAKING A SEALED CONNECTION BETWEEN A TUBE AND A FLEXIBLE HOSE

It is frequently necessary, particularly in industry, to make a sealed connection between a tube and a hose while assembling machines or engines. In particular, in the car industry, this type of connection needs to be provided on the cooling water pipework and also on the liquid fuel feed pipework.

BACKGROUND OF THE INVENTION

In a large number of applications, such a connection is made between a rigid tube which is generally made of metal or a plastic and a hose made of rubber or other flexible and elastically deformable material; both the tube and the hose being substantially circular in cross-section. To this end, the hose is force-fitted over the end of the rigid tube, which tube is sometimes constituted by a simple endpiece integrally molded during manufacture of an engine casing, or else is integral with some engine component such as a cooling radiator, for example. After the hose has been force-fitted onto the rigid tube, the connection is sealed and simultaneously the hose is held in place on the tube by means of a clamping collar. The collar thus prevents leaks occurring through the connection circuit and simultaneously prevents relative sliding or disconnection between the hose and the tube, which could be caused equally well by vibration or by the pressure of the fluid conveyed. Patent application GB-A-2 161 568 describes an assembly of the type outlined above, except insofar as it also includes a clamping ring of longitudinal blades between the hose and the clamping collar. A similar construction is proposed in European patent application 0 219 418.

However, this technique of making a sealed connection between a tube and a hose, in addition to generally requiring the collars to be clamped tightly in order to prevent disconnection, thereby running the risk of causing creep in the hose, does not lend itself easily to automating various assembly operations. At present, it does not seem possible to install and clamp a collar on a hose without manual intervention, possibly assisted by motorized means. In addition, disassembling the connection is not very easy since it generally requires the clamping collar to be destroyed.

Further, ideas already exist for making easily disconnectable devices for rapidly connecting together two pieces of pipework, at least one of which is a hose. In such devices, such as described in patent FR-A-1 458 005 and patent GB-A-2 178 503, the end of at least one of the pieces of pipework is mounted in sealed manner on a rigid endpiece. The endpiece is itself provided with means for making a sealed connection with a complementary rigid endpiece disposed at the end of another piece of pipework, or in some cases constituting an integral part therewith, particularly when the other piece of pipework is constituted by a rigid hose. In addition to sealing members being provided on one or both of the endpieces or incorporated therein, these rigid endpieces include complementary fastening means for preventing them coming apart axially under the effect of the pressure that may exist inside the pipework.

Regardless of the particular type of fastening used, it is essential that two sealing zones are provided, firstly between the flexible piece of pipework (i.e. The hose) and the corresponding endpiece, and secondly between the two complementary endpieces.

There are various different ways in which the sealing can be provided in the first of these two zones.

For example, if the material used is suitable, it is possible to glue or overmold the hose inside or outside its endpiece as proposed in patent GB-A-2 178 503. In this case, sealing and axial fastening between the two pieces are obtained simultaneously by the gluing or the overmolding. However, it should be observed that even when such overmolding is possible, it is relatively expensive. In addition, it is often not possible to glue the hose to its endpiece because of the danger of deterioration at the axial fastening and in the sealing of the fluids conveyed, in particular water.

In general, after fitting a length of the endpiece inside the hose, it is preferred to obtain sealing by means of a clamping collar in a manner similar to that outlined above and in spite of the drawbacks of this technique, as already mentioned.

Various types of disconnectable device for making a sealed connection quickly between a rigid tube and a hose are described in the following French patents: 2 605 705, 2 606 118, 2 608 250, 2 614 084, 2 628 819, 2 628 821, 2 630 522, 2 633 368, and 2 636 713. Although these prior devices do indeed seek to remedy some of the drawbacks mentioned above, they achieve this aim only in part and, above all, they are relatively expensive to manufacture. Further, installation thereof is not very reliable.

Finally, mention is made of Swiss paten CH-A-338 063 which relates to connecting a pipe made of relatively rigid plastic material onto a threaded piece of pipework. Not only are the dispositions described in that patent incompatible with the use of a hose that is flexible, but also, in practice, it should be observed that they require the pipe to be capable of rotating about its own axis.

SUMMARY OF THE INVENTION

The invention therefore provides a disconnectable device for making a sealed connection quickly between a smooth rigid tube and a hose, where the tube and the hose are suitable for mutual axial engagement one within the other, the outside diameter of the tube being greater than the inside diameter of the hose.

According to the invention, the device comprises essentially the following in combination:

firstly a rigid ring preferably made of metal or of a semi-rigid plastic, disposed coaxially around the hose, the ring having an inside shoulder constituting an axial abutment for the outside surface of the hose, said abutment sufficing on its own, by virtue of the wall of the hose being pinched thereagainst, to urge together the sole pair of complementary sealing surfaces of the device, one on the tube and the other on the inside surface of the hose; and secondly complementary axial fastening means connected respectively to the ring and to the tube.

Not only is the device of the invention cheap because of the small number of parts it requires, but it is also completely compatible with fully automating the making of a connection. In addition, as described below, the connection is obtained without exerting large radial forces on the hose, thereby avoiding any danger of creep and of leakage that could result therefrom.

Further, the functional separation between the way the connection is held together and the way it is sealed by a single contact between a single pair of complementary surfaces, one on the tube and the other on the hose, makes it possible to envisage a wide variety of embodiments. However, it is underlined at this point that for reasons which appear clearly below, the part referred to as "the hose" is necessarily flexible and resilient, for example being made of rubber, while the part referred to as "the tube" is rigid or semi-rigid and is made of any suitable material, e.g. of metal or a plastic.

Finally, because of the dispositions provided by the invention, a connection can be installed merely by bringing the tube and the hose together axially, which is an operation that can be automated. When the end surface of the tube is in contact with the inside surface of the hose, with the hose being engaged even to a limited extent over the tube, then any continuation of the relative axial displacement may cause the complementary fastening means to come into co-operation immediately.

BRIEF DESCRIPTION OF THE DRAWINGS

Embodiments of the invention are described by way of example with reference to the accompanying drawings, in which:

FIG. 1 is an axial section view through a device of the invention for making a connection, the device being shown prior to assembly;

FIG. 2 is an end view seen along arrow F1 of FIG. 1, with the tube being omitted;

FIG. 3 is an axial section through the FIG. 1 device after the tube and the hose have been connected together; and FIG. 4 is an axial section analogous to FIG. 3 through a variant embodiment of the device of the invention.

DETAILED DESCRIPTION

Reference is made initially to FIGS. 1, 2, and 3, showing a device for connecting a rigid tube 1 made of metal or of a plastic, for example, together with a flexible hose 2, e.g. made of rubber. The device essentially comprises firstly a ring 3, e.g. of molded plastic material disposed outside the hose 2, and secondly complementary axial fastening means given a general reference 4 and connected both to the ring 3 and to the tube 1.

Prior to connection, the tube 1 and the hose 2 are circular in section, preferably similar in size, with the outside diameter D of the tube 1 nevertheless being a little greater than the inside diameter D' of the hose 2.

The free end of the tube 1 has a chamfer 1a followed by a cylindrical portion 1b whose outside diameter is substantially equal to and preferably no greater than the inside diameter of the hose 2. This cylindrical portion 1b advantageously extends over a certain length specified below. Beyond the cylindrical portion 1b and going away from the free end, the outside surface of the tube has a second cylindrical portion 1f whose outside diameter D is a little greater than the inside diameter D' of the hose 2, as mentioned above, and which runs into the cylindrical portion 1b via a single sloping surface 1g. This sloping surface thus constitutes a frustoconical portion situated close to the free end of the tube 1, unless it constitutes the free end itself of the tube in the event that the cylindrical portion 1b is omitted. It is important to observe that the larger diameter of this frustoconical portion is equal to the outside diameter D of the tube, while its smaller diameter is not more than the diameter D' pf the hose.

Finally, at a certain distance from its free end 1a, the tube 1 includes a radial flange 1d projecting outwards, with its face 1e facing away from the end 1a constituting a shoulder whose purpose is described below.

The inside face of the ring 3 has a cylindrical portion 3a whose inside diameter is substantially equal to the outside diameter of the hose 2 onto which it is to be mounted. As shown in FIG. 3, the length of the cylindrical portion 1b of the tube is preferably sufficient to extend, after mounting, over at least a fraction of the cylindrical portion 3a of the ring.

In general, it is preferable for the inside surface 3a of the ring 3 to be left smooth. The advantages of this disposition are described below.

The inlet end (to the right in FIG. 3) of the ring 3 is preferably chamfered, while its opposite end preferably has an inwardly directed annular shoulder 3d whose inside diameter is close to the outside diameter D of the cylindrical portion 1f of the tube 1.

Radially flexible tabs 5 are integrally molded with the ring 3 and extend parallel to the axis of the ring, which axis becomes the axis common to the tube 1 and to the hose 2 after assembly. In the example shown, there are three such tabs. The free ends 5a of the tabs are hook-shaped and suitable for snap-fastening engagement on the shoulder face 1e of the flange 1d on the tube. When extending freely, the tabs 5 have an inside face 5c between their hooks 5a and the zone where they meet the ring 3 which is cylindrical and parallel to the axis of the ring.

An annular portion 6 coaxial with the ring and provided with a sleeve 6e may be disposed between the tabs 5 prior to making the connection, with the annular portion and its sleeve being free to slide between the shoulder 3d of the ring and the hooks 5a of the tabs. The inside diameter of the sleeve 6e is substantially equal to the outside diameter D of the cylindrical portion 1f of the tube 1, and its length is substantially equal to the length of the tabs minus the thickness of the flange 1d.

Between two successive tabs, the outside periphery of the annular portion 6 is advantageously in the form of a cam 6c, making contact with the inside face 5c of the tabs and terminated by a lug 6d for grasping (FIG. 2).

Finally, between the shoulder 3d and the cylindrical portion 3a of the ring, there is an annular groove 3e whose cylindrical bottom 3f leaves a sharp edge 3g where the cylindrical portion 3a and the flank 3h of the groove 3e meet. The purpose of this disposition is described below.

The tube and the hose are connected together as follows.

Firstly the ring 3, optionally together with its annular portion 6, is mounted on the hose 2 so that the hose comes into contact with, or at least comes close to, the shoulder 3d (the dashed line position shown in FIG. 1). This operation is easy to perform because of the smooth surface 3a of the ring, and it may be done in the factory, with the assembly constituted by a hose and its ring then being taken to the site where a connection is to be made. A weak spot of glue between the ring 3 and the hose 2 is generally sufficient to ensure that they stay together while being transported to the site where they are to be used. Naturally, the operation of fitting the hose inside the ring is suitable for being automated, and a chamfer at the inlet to the ring makes this operation easier.

In order to connect the tube 1 and the hose 2, the hose together with its ring 3 is presented to the end 1a without there being any need to set up any specific angular orientation about its axis.

The end 1a of the tube 1 is caused to penetrate into the hose by moving the hose 2 axially towards the tube 1. If present, the sleeve 6e facilitates guidance and centering of the end of the tube 1, and this may be important if the operation is to be automated. At the beginning of the movement, the wall of the hose offers practically no resistance to penetration of the cylindrical portion 1b, but when the frustoconical portion 1g of the tube encounters the free end of the hose 2, then the hose is pushed radially outwards into the housing constituted by the groove 3e (FIG. 3).

Sealed connection between the tube 1 and the hose 2 engaged thereon is achieved once the complementary fastening means 1d and 5a co-operate with each other, as can be seen in the position shown by solid lines in FIG. 3.

Sealing is achieved by the frustoconical portion 1g of the tube bearing against the inside face of the wall of the hose 2 which is deformed in its region 2a so as to constitute a surface which is complementary to the portion 1g of the tube. The wall of the hose is then pinched and compressed between the frustoconical portion 1g and either the face 3h or the edge 3g of the groove 3e, with the face 3h or the edge 3g thus constituting an axial abutment. The compression force naturally depends on the dimensions chosen, but it may be relatively small. In particular, it should be observed that the free end of the hose is merely pushed into the housing constituted mainly by the groove 3e. Indeed, it is advisable to avoid compressing this free end inside the groove 3e. To this end, the diameter of the bottom 3f of the groove should advantageously exceed the larger diameter D of the frustoconical portion 1g of the tube by not less than the thickness of the hose. In addition, it is necessary for the distance d between the face 1e of the flange 1d and the beginning of the chamfer 1g to be no greater than, and preferably perceptibly less than, the distance d' between the engagement surface of the hooks 5a and the beginning 3g of the cylindrical portion 3a of the ring.

The fastening means 4 clearly prevent the tube 1 and the ring from coming apart axially. In addition, the hose 2 is securely retained in the groove 3e of the ring because of the necking that occurs between the facing zones of the edge 3g and of the frustoconical portion 1g. the effectiveness of the necking is generally improved by the fact that the cylindrical portion 1b of the tube extends over at least a fraction of the cylindrical portion 3a of the ring.

If it is desired to take the connection apart, the annular portion 6 is rotated around the tube 1 in the direction of arrow F (FIG. 2) in order to bring each lug 6d into the vicinity of the front end of a tab 5. During this motion, the tabs 5 are splayed apart to reach the position shown in dot-dashed lines in FIGS. 2 and 3, thereby releasing the hooks 5a from the flange 1d. Pulling the hose 2 in the direction of arrow F1 then moves it away from the tube 1.

The person skilled in the art may have already observed various advantages of the invention. The number of parts required for making the device is small, and they do not require making very accurately. The cost of the device is thus low. Further, the axial force with which the tube 1 is engaged in the hose 2 up to locking taking place may itself be low, e.g. about 200 newtons for a hose diameter of about 40 mm, and assuming that the pressure of the fluid conveyed is less than 10 bars.

The complement art fastening means on the ring and the tube may naturally be of very different types. Thus, by way of example. FIG. 4 shows a variant embodiment in which items described above with respect to the embodiment shown in FIGS. 1 to 3 are given the same reference numerals plus 10.

In the variant of FIG. 4, the tabs 15 are connected to the tube 11 and they are preferably integrally molded therewith. They have hooks 15a which engage behind the ring 13 at the end of a connection operation, with the edge 13j of the ring performing a function analogous to the face 1e of the flange 1d.

The unlocking annular portion 16 and its sleeve 16e are shown diagrammatically. They are preferably of the same type as described for the preceding embodiment. The same applies to the groove 13e and the shoulder 13d. On the tube 11, they correspond to a frustoconical portion 11g whose outside diameter pushes back the wall of the hose 12 into the groove 13e while pitching it against the edge 13g.

Various advantages of the invention are mentioned above. It should also be observed, in general, that the dimensions of the various parts and the tolerances required for assembly and disassembly should be designed in each case to ensure that the free end of the hose is compressed and deformed by an amount which is just sufficient to obtain a surface on the hose suitable for conferring the required degree of sealing to the connection. In this respect, it is mentioned that tests have shown that the invention can easily be adapted to meet the most severe requirements in the art.

Finally, although the axial fastening means are of the same general type in the examples described, complementary members of other types could also be used, for example of the type commonly referred to as a "bayonet" coupling and as described, in particular, in the present Applicants' French patent application number 90 02537 filed Feb. 28, 1990. Such a coupling is suitable, in particular, for fully automated installation. In addition, when providing a releasable connection it is generally possible to make use of one part only.

I claim:

1. A disconnectable device for making a sealed connection quickly between a smooth and rigid tube and a flexible hose having an expandable end which is engaged over an end of the rigid tube, the tube comprising a first cylindrical portion having an outside diameter which is greater than the inside diameter of the hose, and comprising a first frustoconical portion in which tube diameter is progressively reduced, in the direction towards the end of the tube, from the diameter of the first cylindrical portion to a diameter which is no greater than the inside diameter of the hose, wherein the device essentially comprises, in combination:

firstly a rigid ring disposed coaxially around the hose, the ring having (i) a cylindrical portion whose inside diameter is substantially equal to the outside diameter of the hose, and (ii) an annular groove defining an inside shoulder adapted to constitute an axial abutment for the outside surface of the hose, the diameter of the bottom of said groove exceeding the outside diameter of the tube by not less than the thickness of the hose, secondly complementary axial fastening means connected respectively to the ring and to the tube, said ring being fastened on said hose in a position such that a free end of the hose is located inside the ring, facing said annular groove beyond said inside shoulder, fastening of the ring being such as to fix the ring on the hose in an unexpanded state of the expandable end of the hose, whereby, upon fastening of said complementary means, said outside surface of the hose is pinched as the expandable end of the hose is expanded over the first frustoconical portion of the tube to thereby retain the hose on the tube and to urge together the sole pair of complementary sealing surfaces of the device, one on the outside surface of the tube and the other on the inside surface of the hose.

2. The device according to claim 1, wherein said ring is made of metal.

3. The device according to claim 1, wherein said ring is made of a semi-rigid plastic.

4. The device according to claim 1, wherein said ring is fastened on said hose by gluing.

5. The device according to claim 1, wherein said ring is fastened on said hose as said cylindrical portion of the ring is fastened on said hose.

6. The device according to claim 1, wherein said cylindrical portion of the ring is smooth.

7. The device according to claim 1, wherein the inside diameter of said cylindrical portion of the ring is no greater than the outside diameter of said hose.

8. The device according to claim 1, wherein the end of said tube comprises a second cylindrical portion which extends beyond the first frustoconical portion of the tube, whose outside diameter is substantially equal to the inside diameter of said hose, and whose length is sufficient to ensure that, after a connection has been made, said second cylindrical portion of the tube extends, inside the hose, into at least a fraction of said cylindrical portion of the ring.

9. The device according to claim 8, wherein the tube comprises a second frustoconical portion in which the tube diameter is progressively reduced, in the direction towards the end of the tube, from the diameter of the second cylindrical portion to a diameter which is at least equal to the inside diameter of the tube.

10. The device according to claim 1, said inside shoulder forming a sharp edge.

11. The device according to claim 1, said fastening means comprising at least one tab on said ring and a complementary edge on said tube.

12. The device according to claim 1, said fastening means comprising at least one tab on said tube and a complementary edge on said ring.

13. The device according to claim 1, said fastening means comprising snap-fastening means.

* * * * *

UNITED STATES PATENT AND TRADEMARK OFFICE
CERTIFICATE OF CORRECTION

PATENT NO. :   5,131,687

DATED      :   July 21, 1992

INVENTOR(S) :
               JACQUES MARCHOU

It is certified that error appears in the above-identified patent and that said Letters Patent is hereby corrected as shown below:

Col. 1, line 26, "collor" should read -- collar --

Col. 5, line 43, "the effectiveness" should read --The effectiveness--

Col. 5, line 65, "complement art" should read --complementary--

Col 7, line 2, after "pinched" insert -- against said a abutment and expanded into said groove--

Signed and Sealed this

Twenty-first Day of September, 1993

Attest:

BRUCE LEHMAN

*Attesting Officer*     *Commissioner of Patents and Trademarks*